United States Patent [19]

Losavio et al.

[11] Patent Number: 5,543,633
[45] Date of Patent: Aug. 6, 1996

[54] PROCESS AND STRUCTURE FOR MEASURING THE PLANARITY DEGREE OF A DIELECTRIC LAYER IN AN INTEGRATED CIRCUIT AND INTEGRATED CIRCUIT INCLUDING MEANS FOR PERFORMING SAID PROCESS

[75] Inventors: Aldo Losavio, Bergamo; Giuseppe Crisenza; Giorgio De Santi, both of Milan, all of Italy

[73] Assignee: SGS-Thomson Microelectronics S.r.l., Milan, Italy

[21] Appl. No.: 92,717

[22] Filed: Jul. 15, 1993

[30] Foreign Application Priority Data

Jul. 15, 1992 [EP] European Pat. Off. ............ 92830382

[51] Int. Cl.⁶ .................................................... H01L 23/58
[52] U.S. Cl. ........................ 257/48; 257/536; 257/758; 324/691; 324/693; 324/706; 324/719
[58] Field of Search .................... 257/48, 758, 536, 257/537, 538; 324/691, 693, 704, 706, 719; 477/8, 10; 156/627

[56] References Cited

U.S. PATENT DOCUMENTS

| | | | |
|---|---|---|---|
| 3,974,443 | 8/1976 | Thomas | 324/719 |
| 4,918,377 | 4/1990 | Buehler et al. | 324/691 |
| 5,231,051 | 7/1993 | Baldi et al. | 437/187 |

FOREIGN PATENT DOCUMENTS

| | | |
|---|---|---|
| 0455455 | 11/1991 | European Pat. Off. . |
| 4-261023 | 9/1992 | Japan ..................................... 257/758 |
| 2083229 | 8/1980 | United Kingdom . |
| 2063560 | 6/1981 | United Kingdom . |

OTHER PUBLICATIONS

Smith, Ralph J., *Circuits, Devices and Systems,* John Wiley & Sons, 1966 and 1971, p. 670.
Gniewek, J. and G. Lukianof, "Evaluating Insulation Layer Quality and Measuring Defect Density," *IBM Technical Disclosure Bulletin* 14(5):1433, New York, Oct. 1971.
Leinen, R. F., "Overview of Photomask Substrate Flatness Measurement Techniques," *Solid–State Technology* 21(5):77–81, Washington, May 1978.

*Primary Examiner*—Sara W. Crane
*Attorney, Agent, or Firm*—David V. Carlson; Seed and Berry LLP

[57] ABSTRACT

A method for measuring the degree of planarity in an integrated circuit includes depositing, onto a dielectric layer to be measured for planarity, a predetermined measure path of a conductive film and measuring the electric resistance of said measure path. The resistance of such a measure path is minimal where the surface on which it has been deposited is perfectly planar, and increases with the surface deviation from perfect planarity. An integrated circuit containing a measurement portion of conductive film and a reference portion of conductive film is described.

16 Claims, 2 Drawing Sheets

PROCESS AND STRUCTURE FOR MEASURING THE PLANARITY DEGREE OF A DIELECTRIC LAYER IN AN INTEGRATED CIRCUIT AND INTEGRATED CIRCUIT INCLUDING MEANS FOR PERFORMING SAID PROCESS

DESCRIPTION

1. Technical Field

This invention relates, in a first aspect thereof, to a process of measuring the degree of planarity of a dielectric layer in an integrated circuit, and in a second aspect, to an integrated circuit including means for performing the process.

2. Background of the Invention

In the manufacture of integrated circuits, a variously shaped intermediate layer of polycrystalline silicon is first deposited onto a semiconductor substrate and then covered with a dielectric layer, both depositions being carried out using conventional photolithographic techniques. Due to the intermediate layer being discontinuous, the dielectric layer overlay usually exhibits a surface which is not perfectly than truly planar.

In view of the trend toward ever smaller minimum dimensions for the device structures formed by the photolithographic process, the planarity of the dielectric layers has attained outstanding importance vis-à-vis the lithographic definition of the structures to be subsequently formed.

Owing to the extremely small magnitude of the geometric quantities involved, the technique which is more generally employed to measure the degree of planarity is based on observation under the electron scan microscope of a section of the surface; thus, it becomes necessary to have the integrated circuit cut and destroyed. Consequently, this known technique can only be applied on a sampling basis and provides, in practice, a way of monitoring only the average quality of a production.

SUMMARY OF THE INVENTION

According to principles of the present invention, there is provided a non-destructive process and structure whereby the degree of planarity of a dielectric layer in an integrated circuit can be measured.

Accordingly, this invention provides, in one embodiment, a process of measuring the degree of planarity of a dielectric layer in an integrated circuit, being characterized in that it comprises the steps of: depositing, onto a dielectric layer to be measured for planarity, a predetermined measure path of a conductive film; and measuring the electric resistance through said measurement path.

The resistance of such a measure path is minimal where the deposition surface is perfectly planar, and increases as the surface deviates from perfect planarity.

This is thought to be due to the length of the conductive film path being longer, the more irregular is the surface shadowed by the path; then, as is well known, the resistance opposed by a material to an electric current flowing through it will be, for given resistivity and cross-sectional area, directly proportional to the length of the material.

Preferably, in one embodiment, the measure path resistance is measured against the resistance of a reference path identical with the measure path but deposited across a perfectly planar surface.

In fact, because an absolute measure of the resistance value could be easily affected by errors, a comparative process is definitely more convenient and accurate, according to this embodiment.

According to another embodiment, in order for the resistance differences to be assessed with the utmost accuracy, it is preferable to have the comparison carried out on a Wheatstone bridge arrangement made up of the measure path and three identical reference paths. This arrangement is well known by the very high accuracy with which it can measure electric resistance.

Also for the purpose of maximizing the measure accuracy, the measure and reference paths are formed on the same integrated circuit, the former onto the portion to be tested for planarity and the latter onto perfectly planar portions in the various embodiments described herein.

In this way, both the measure path and the reference paths can be formed jointly under the same conditions and on the same equipment, to thereby minimize the likelihood of resistance differentials arising from structural differences in the paths which are unrelated to the degree of planarity.

According to a still further alternative embodiment of the invention, an integrated circuit comprises a continuous semiconductor substrate, a discontinuous intermediate layer (typically of polycrystalline silicon) disposed over a portion of the substrate, a dielectric layer deposited onto the substrate and the discontinuous intermediate layer, said dielectric layer having a surface to be tested for planarity, characterized in that it is provided with a measure path of a conductive film deposited across said surface of the dielectric layer at the location of the portion with the discontinuous intermediate layer.

Such an integrated circuit includes sufficient structure for performing the aforesaid process.

Preferably, according to an alternative embodiment, the circuit also includes a reference path of a conductive film, identical with the measure path, deposited across a perfectly planar portion of the integrated circuit.

According to a further alternative embodiment, the circuit includes said measure path and three such reference paths so interlinked electrically as to form a Wheatstone bridge arrangement.

Conveniently, the three reference paths are formed on peripheral portions of the integrated circuit.

Further features and advantages of a process and an integrated circuit according to the invention will become more clearly apparent from the following detailed description of preferred embodiments thereof, to be read in conjunction with the accompanying drawings.

BRIEF DESCRIPTION OF THE DRAWINGS

FIG. 1 shows a cross-section through a portion of the integrated circuit, with a substrate on which a discontinuous intermediate layer has been deposited.

FIG. 2 is a sectional view of the same circuit portion as in FIG. 1, with a dielectric layer deposited thereon.

FIG. 3 is a sectional view of the same circuit portion as in FIG. 2, with a measure path deposited thereon.

FIG. 4 is a sectional view of a portion of the integrated circuit having no discontinuous intermediate layer over the substrate.

FIG. 5 is a sectional view of the same circuit portion as in FIG. 4, with a dielectric layer deposited thereon.

FIG. 6 is a sectional view of the same circuit portion as in FIG. 5, with a reference path deposited thereon.

DETAILED DESCRIPTION OF THE INVENTION

Figure 1:
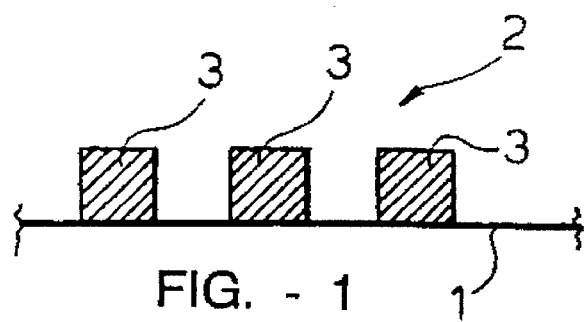
FIGS. 1 to 6 illustrate in schematic form subsequent manufacturing steps of an integrated circuit according to the invention.
Figure 4:
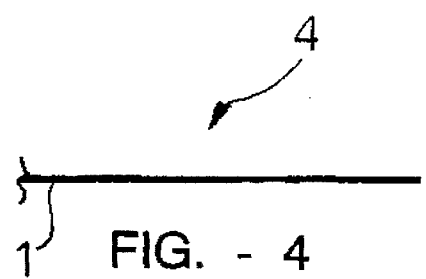

In the drawing figures, specifically in FIGS. 1 and 4, there is shown at 1 a continuous semiconductor substrate of an integrated circuit. In a portion 2 of the integrated circuit, a discontinuous intermediate layer 3, e.g. of polycrystalline silicon, is deposited over the substrate 1.

At portions 4, the substrate 1 has no discontinuous intermediate overlay, and the portions 4 are, therefore, perfectly planar. As will be appreciated, the term perfectly planar is a relative term and includes those generally flat surfaces used as a standard for the planar measurement. It is not limited solely to surfaces that are in fact perfect in their planarity.

In one embodiment, the portions 4 are on a peripheral region of the chip, and may be spaced from the portion 2. They may, for example, be adjacent the bonding pads, may be the bonding pads themselves, or may be at some other non-critical location in a peripheral region of the integrated circuit. Alternatively, the portions 4 may be off the integrated circuit, but on the same wafer, such as in the scribe line. Also, alternatively, the portions 4 may be adjacent the portion 1 on the integrated semiconductor circuit.

Figure 2:
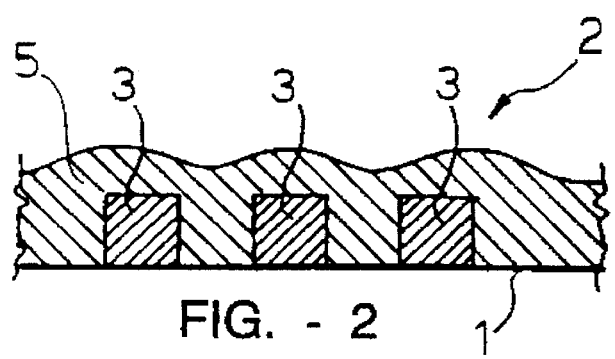
Figure 5:
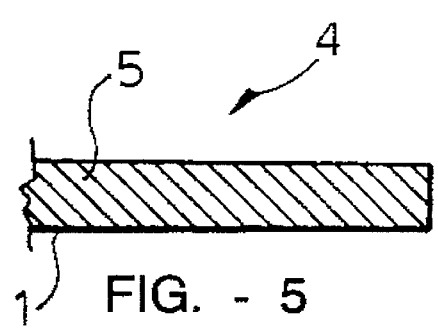

During the next manufacturing step of the integrated circuit, as particularly illustrated by FIGS. 2 and 5, a dielectric covering layer 5 is added. In the portion 2 provided with the discontinuous intermediate layer, the surface of the dielectric layer 5 is not perfectly planar, and shows undulations which follow the run of the underlying layer 3; in the portions 4, the surface of the dielectric layer 5 is instead perfectly planar because perfectly planar is the surface on which it is deposited.

Figure 3:
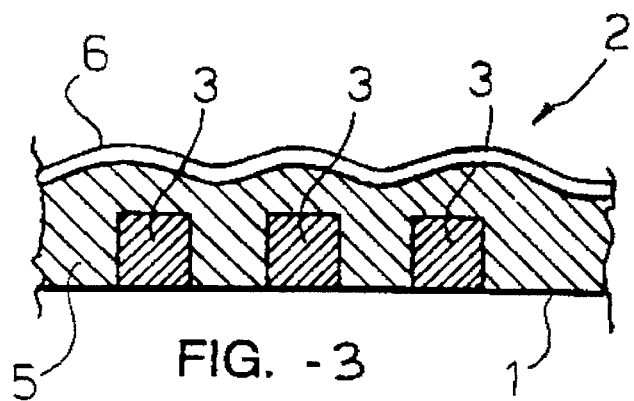
Figure 6:
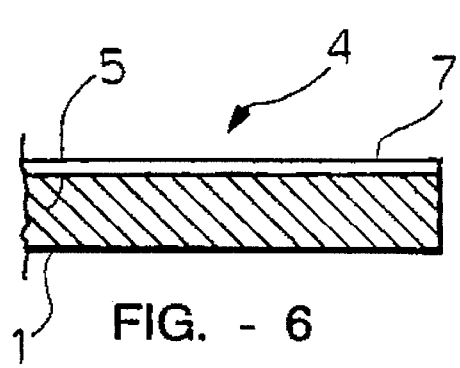
Figure 8:
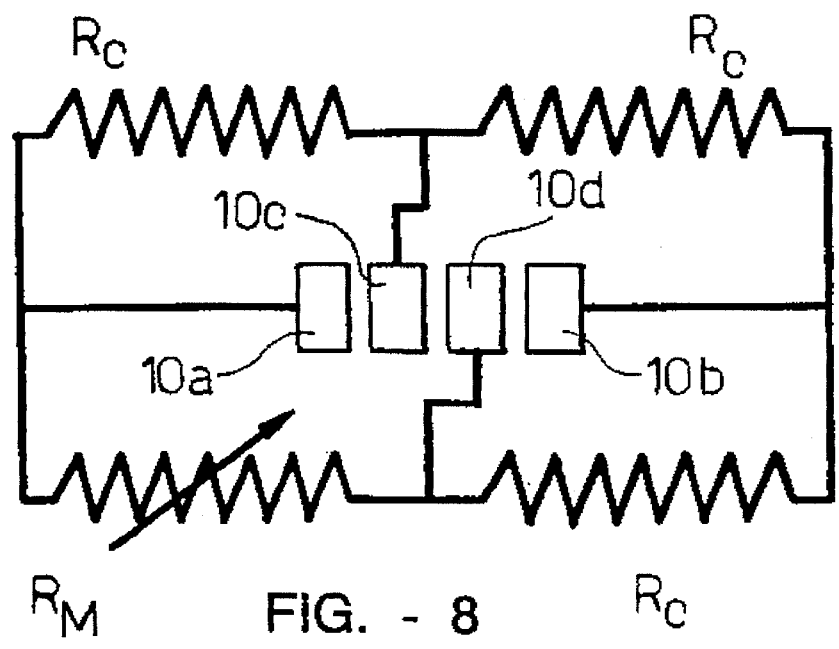
FIG. 8 is a circuit diagram for the measure and reference paths.
Figure 7:
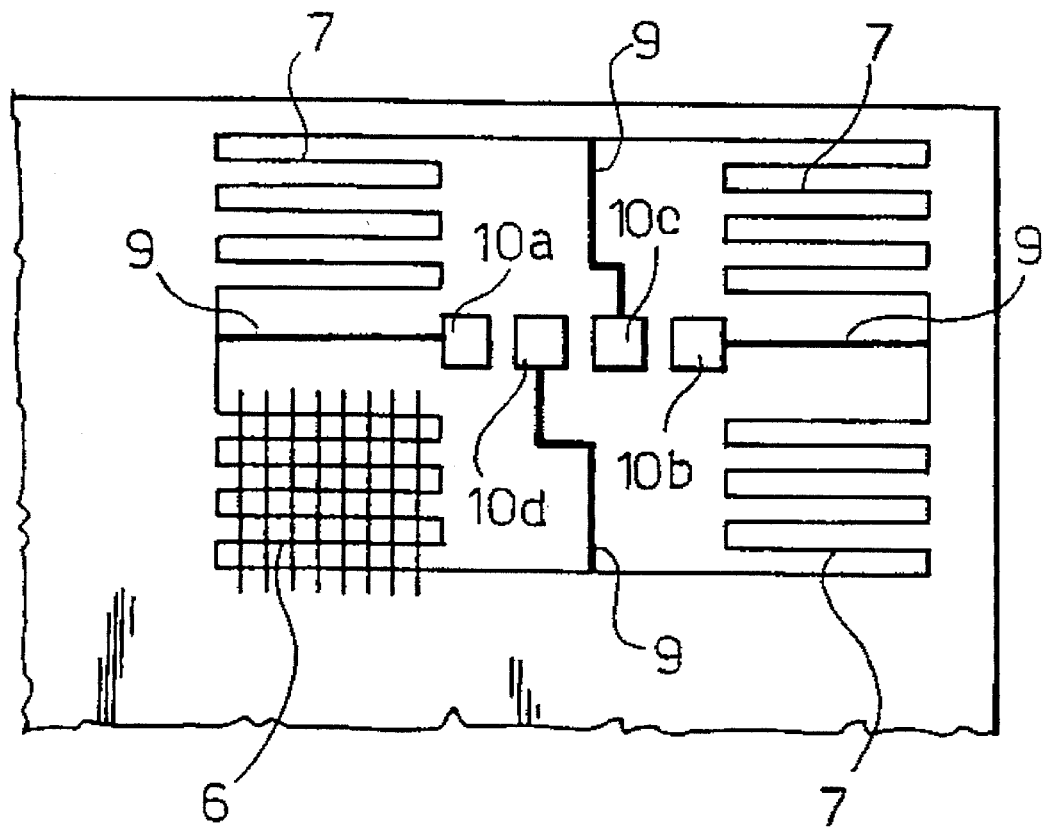
FIG. 7 is a plan view showing schematically the measure and reference paths.

A metallic conductive film is deposited over the dielectric layer 5 into a measure path 6 and three reference paths 7, as shown in FIGS. 3, 6 and 7. The four paths are all identical with one another (in plan view, as previously explained) and laid into a preferably meandering pattern so as to concentrate the longest possible path within the smallest possible area.

The measure path 6 is deposited at the portion 2 of the integrated circuit, whilst the reference paths 7 are deposited at the portions 4 thereof. Preferably, the measure path 6, is laid such that its individual straight sections are oriented substantially perpendicular to any substantially straight sections of the discontinuous intermediate layer 3.

Formed from the same metallic film as the paths 6 and 7 are also electric connection sections, collectively designated 9, which are connected to the paths themselves and to four terminals 10a, 10b, 10c, 10d.

The circuit shown in FIG. 7 can be positioned in its entirety (portions 2 and 4) in a peripheral region in the integrated circuit, a scribe line on a wafer, or other acceptable location with all the portions 2 and 4 adjacent each other if desired.

Where the surface of the dielectric layer 5 is perfectly planar, the electric resistance of the path will show a given value; on the other hand, where the surface is not planar, then the electric resistance of the path will be the higher, the greater is the deviation of the surface from perfect planarity. In summary, the resistance $R_M$ of the measure path 6 is higher than the resistance $R_C$ of the reference path 7, and the degree of planarity of the surface can be appreciated from the value of the resistance $R_M$.

To find the value of the resistance $R_M$, according to the alternative embodiment, the measure path 6, three reference paths 7, connecting sections 9, and terminals 10 are all disposed into a Wheatstone bridge arrangement.

This arrangement is well-known in electrical technology and enables a difference between the resistance $R_M$ of the measure path 6 and the resistance RC of the reference paths 7 to be assessed with great accuracy. Specifically, when a voltage VAB is applied to the terminals 10a and 10b, the voltage VCD measured across the terminals 10c and 10d will be given by the following relation:

$$V_{CD}=V_{AB} (1/2-R_C/R_C+R_M) \tag{1}$$

By appropriate computation, it can be shown that the resistive value for the measure path 6 is given by the following relation:

$$R_M=R_C [(V_{AB}+2V_{CD})/(V_{AB}-2V_{CD})] \tag{2}$$

The resistive value thus obtained is then checked against a preset scale indicating the degree of planarity. This scale can be established empirically. Any other techniques for measuring rather exactly like resistance of measure path 6 or comparing its resistance to that of one or more reference paths 7 could also be used.

It will be readily apparent that an integrated circuit embodying this invention is inherently equipped to measure the degree of planarity of the dielectric layer non-destructively. This measure can be taken by the following process of this invention as explained.

As will be appreciated, the number of layers under the measure path 6 can vary from one to many, depending on the step or structure in the semiconductor manufacturing process or circuit at which the planarity measurement is to be performed.

While the foregoing example depicts an exemplary integrated circuit, those skilled in the art will recognize that the principles of the present invention are equally applicable to complex integrated circuits. A complex integrated circuit may comprise multiple intermediate layers of material such as oxide layers and polysilicate layers. These intermediate layers may be grown, deposited, etched, or otherwise processed to create complex patterns on the planar substrate 1. The dielectric layer 5 may cover multiple intermediate layers over the substrate 1.

In particular, this measuring process of the degree of planarity can be readily incorporated to the standard sequence of electric tests which any integrated circuit is to go through. The appropriate electrical probe providing power to the circuit of FIG. 7 can be used to provide the voltages described herein.

We claim:

1. A process of measuring the degree of planarity of a dielectric layer in an integrated circuit, comprising the steps of:

depositing, onto a dielectric layer to be measured for planarity, a predetermined measure path of a conductive film;

depositing, onto a planar surface, a predetermined reference path of said conductive film;

measuring the electric resistance through said reference path;

measuring the electric resistance through said measure path; and comparing said measured measure path electric resistance with said measured reference path electrical resistance to determine the deviation of said dielectric layer from planarity.

2. A process according to claim 1, wherein the comparative measure is effected on a Wheatstone bridge arrangement comprising the measure path and three identical reference paths.

3. A process according to claim 2, wherein the measure and reference paths are formed on the same integrated circuit, the former onto the portion thereof to be measured for planarity and the latter onto perfectly planar portions.

4. A process according to claim 3, wherein the perfectly planar portions having the reference paths deposited thereon are peripheral portions of the integrated circuit.

5. An integrated circuit comprising a continuous substrate, a discontinuous intermediate layer disposed over a portion of the substrate, a dielectric layer deposited onto the substrate and the discontinuous intermediate layer, said dielectric layer having a surface to be tested for planarity, characterized in that it comprises a measure path of a conductive film deposited across said surface of the dielectric layer at the location of the portion with the discontinuous intermediate layer, reference path of said conductive film being identical with said measure path and deposited onto a perfectly planar portion of the integrated circuit, said reference path providing a resistance indication of a planar surface, said measure path providing a resistance indicative of the deviation from planarity of said surface when said measure path resistance is compared to said reference path resistance.

6. An integrated circuit according to claim 5 and including said measure path and three such reference paths electrically connected to one another into a Wheatstone bridge arrangement.

7. An integrated circuit according to claim 6, wherein the three reference paths are formed on peripheral portions of the integrated circuit.

8. An integrated circuit comprising:

a substrate;

a layer overlaying the surface of said substrate;

a dielectric layer overlaying said layer and said substrate;

a reference conductive film deposited on said dielectric layer overlaying said substrate;

a measurement conductive film deposited upon said dielectric layer overlaying said layer to permit the measurement of planarity of said dielectric layer; and means for determining the planarity of said dielectric layer by measuring the resistance of said measurement conductive film and the resistance of said reference conductive film, a comparison between said measurement conductive film resistance and said reference conductive film resistance being indicative of a deviation from planarity of said dielectric layer overlaying said layer.

9. The circuit of claim 8 wherein said reference conductive film comprises three conductive film portions, said comparison being performed by a Wheatstone bridge using the resistance of said three reference portions and the resistance of said measurement conductive film deposited on said dielectric layer deposited over said layer.

10. An integrated circuit comprising:

a substrate;

a layer overlaying the surface of said substrate;

a dielectric layer overlaying said layer and said substrate;

a measurement conductive film strip deposited on a measurement portion of said dielectric layer, said measurement portion overlaying said layer;

a planar reference conductive film strip deposited on a planar reference portion of said dielectric layer, said reference portion overlaying said substrate; and electrode terminals electrically connected to the measurement conductive film and reference conductive film, respectively, the electrode terminals being adapted to be contacted by a resistance measuring device that measures the resistance of said measurement conductive film strip and said planar reference conductive film strip, respectively, the resistance difference between the measurement conductive film and the planar reference conductive film being a measurement of the deviation from planarity of said dielectric layer overlaying said layer.

11. The integrated circuit according to claim 10, wherein the reference conductive film strip is positioned adjacent the measurement conductive film strip and three electrode terminals are provided, one electrode terminal being electrically connected in common to the measurement conductive film strip and the reference conductive film strip and the other two electrodes being connected to different ends of the measurement conductive strip and the reference conductive strip, respectively.

12. The integrated circuit according to claim 10, wherein said reference conductive film includes first, second, and third reference portions, said first reference portion being electrically coupled to a first end of said measurement conductive film and having one electrode terminal electrically connected thereto, said second reference portion being electrically coupled to a second end of said measurement conductive film and having another electrode terminal electrically connected thereto, and said third reference portion being electrically coupled to said first reference portion and said second reference portion and having an electrode terminal electrically connected between the first and third reference portions and the second and third reference portions, respectively.

13. The integrated circuit according to claim 10 wherein said electrode terminals, measurement conductive strip, and reference conductive strip are all formed from the same integral conductive strip that extends over different regions of the substrate.

14. The integrated circuit according to claim 10 wherein the electrode terminals are planar metallic pads that are electrically exposed and are positioned for contact by an external probe that is adapted to apply power to measure the resistance of the measurement conductive strip and the reference conductive strip.

15. A method of measuring a degree of planarity in an integrated circuit having a substrate, comprising the steps of:

depositing a first intermediate layer overlaying the surface of the substrate;

depositing a dielectric layer covering the first layer and the substrate;

depositing a planar reference conductive film on the dielectric layer covering the substrate;

measuring a planar reference electrical resistance of said planar reference conductive film;

depositing a measurement conductive film upon the dielectric layer covering the first layer;

measuring a measurement electrical resistance of said measurement conductive film; and comparing said measurement electrical resistance with said planar reference electrical resistance to determine the degree of deviation from planarity of the dielectric layer covering the first layer based on said compared electrical resistances.

16. The method of claim 15 wherein said planar reference conductive film comprises a plurality of conductive film portions each having a substantially identical planar reference resistance, said step of comparing being performed by comparing said plurality of planar reference resistances to said measurement resistance.

* * * * *